(12) United States Patent
Davoine et al.

(10) Patent No.: US 9,539,853 B2
(45) Date of Patent: Jan. 10, 2017

(54) CYCLE WHEEL SPOKE AND CYCLE WHEEL COMPRISING SUCH A SPOKE

(71) Applicant: MAVIC S.A.S., Metz-Tessy (FR)

(72) Inventors: Michel Davoine, Gruffy (FR); Claude Righini, Veyrier du Lac (FR); Joseph Normand, Mery (FR)

(73) Assignee: MAVIC S.A.S., Metz-Tessy (FR)

( * ) Notice: Subject to any disclaimer, the term of this patent is extended or adjusted under 35 U.S.C. 154(b) by 671 days.

(21) Appl. No.: 13/870,521

(22) Filed: Apr. 25, 2013

(65) Prior Publication Data
US 2013/0285436 A1    Oct. 31, 2013

(30) Foreign Application Priority Data
Apr. 27, 2012    (FR) ...................................... 12 01255

(51) Int. Cl.
*B60B 1/00* (2006.01)
*B60B 1/02* (2006.01)
*B60B 1/04* (2006.01)
*B60B 5/02* (2006.01)

(52) U.S. Cl.
CPC ............. *B60B 1/003* (2013.01); *B60B 1/0246* (2013.01); *B60B 1/0261* (2013.01); *B60B 1/041* (2013.01); *B60B 5/02* (2013.01); *B60B 2310/2082* (2013.01); *B60B 2310/224* (2013.01); *B60B 2310/52* (2013.01); *B60B 2360/3416* (2013.01); *Y10T 29/49506* (2015.01)

(58) Field of Classification Search
CPC .............. B60B 1/00; B60B 1/02; B60B 1/003; B60B 1/0261; B60B 1/0246
USPC ............................... 301/58, 59, 61, 104, 64.7
See application file for complete search history.

(56) References Cited

U.S. PATENT DOCUMENTS

| | | | | |
|---|---|---|---|---|
| 5,350,221 | A | * | 9/1994 | Pearce ................... B60B 1/003 301/104 |
| 6,036,281 | A | * | 3/2000 | Campbell ............... B60B 1/003 301/104 |
| 7,354,114 | B2 | | 4/2008 | Passarotto et al. |
| 7,631,947 | B2 | * | 12/2009 | Mercat ................... B60B 1/003 301/104 |

(Continued)

FOREIGN PATENT DOCUMENTS

| | | |
|---|---|---|
| EP | 1 559 581 A1 | 8/2005 |
| EP | 1 930-146 A1 | 6/2008 |

(Continued)

*Primary Examiner* — S. Joseph Morano
*Assistant Examiner* — Jean Charleston
(74) *Attorney, Agent, or Firm* — Greenblum & Bernstein, P.L.C.

(57) ABSTRACT

A spoke including a metallic core covered, at least in its central portion, with a sheath of composite material comprised of an assembly of fibers embedded in a matrix, the core including an end portion adapted to be attached to the rim or the hub of a wheel, and a main body whose cross-sectional surface area is between 30% and 50% or, in a particular embodiment, between 35% and 45%, of the cross-sectional surface area of the aforementioned end portion. Furthermore, in the area of the main body, the sheath has a cross section between 150% and 500% or, in a particular embodiment, between 150% and 350%, of the cross section of the metallic core in the same area. The metal core includes two mechanical anchoring zones, positioned in the vicinity of its ends, on both sides of the main body.

19 Claims, 6 Drawing Sheets

(56) References Cited

U.S. PATENT DOCUMENTS

| | | |
|---|---|---|
| 7,735,936 B2 | 6/2010 | Passarotto et al. |
| 7,926,884 B2 * | 4/2011 | Heyse .................. B29C 70/342 |
| | | 301/104 |
| 8,162,407 B2 | 4/2012 | Mercat et al. |
| 8,215,720 B2 | 7/2012 | Mercat et al. |

FOREIGN PATENT DOCUMENTS

| | | |
|---|---|---|
| FR | 2 900 869 A1 | 11/2007 |
| FR | 2 915-710 A1 | 11/2008 |
| WO | WO-03/018331 A1 | 3/2003 |
| WO | WO-2011/137665 A1 | 11/2011 |

* cited by examiner

Fig. 6

CYCLE WHEEL SPOKE AND CYCLE WHEEL COMPRISING SUCH A SPOKE

CROSS-REFERENCE TO RELATED APPLICATION

This application is based upon French Patent Application No. FR 12/01255, filed Apr. 27, 2012, the disclosure of which is hereby incorporated by reference thereto in its entirety and the priority of which is claimed under 35 USC §119.

BACKGROUND

1. Field of the Invention

The present invention relates to a cycle wheel spoke and a cycle wheel comprising such a spoke.

2. Background Information

Conventionally, the spokes of a cycle wheel are tensioned when the wheel is assembled because, due to their length and small cross section, they cannot work in compression. When the cycle is in use, the spokes are subject to fatigue development, as they undergo a load cycle with each turn of the wheel, thereby constantly varying their tension. Indeed, when a spoke is located between the ground and the wheel hub (such as positioned vertically in relation to the ground), its tension is reduced due to a slight deformation of the wheel caused by the cyclist's weight which provides a force countering tension; and when a spoke passes above the hub (again, such as positioned vertically in relation to the ground), it is re-tensioned by the pre-stressing and the load effect. The ends of the spokes, each having a fastening zone enabling them to be assembled to the rim or the hub of the wheel, are more affected by the fatigue phenomenon than the central portion of the spokes, due to the stress concentrations caused by the geometric variations of the fastening zones (thread, elbow, head, etc.), and therefore have a greater risk of breakage. Therefore, the ends of the spokes must have higher mechanical properties than those of the central portion of the spokes, which is why their cross section is conventionally greater than that of the central portion.

In addition to a very good tensile strength, the spokes must have a certain degree of flexural flexibility. A flexural flexibility of the spokes provides the entire wheel with greater resistance to side impacts, such as those encountered, for example, when a cyclist riding in a very compact group of riders inadvertently moves too close to another cyclist and the spokes of his front wheel engage the rear derailleur of the cyclist immediately ahead of him/her. Such engagement is capable of breaking a plurality of spokes, which can cause the front wheel to collapse and the cyclist to lose control of the bike, thereby resulting in a very serious fall. When a spoke has a certain flexibility, this type of engagement may damage the spoke without causing it to break.

Spokes made of a metallic material, such as steel, can combine good tensile strength and flexibility, but these spokes are heavy.

Spokes made of a composite material are, for equal strength, much lighter but more fragile. In particular, composite materials have exceptional tensile properties, but also very low shear properties, which does not make it possible to provide efficiently working threads on composite rods. Therefore, these materials are very well suited to the central zone which is subject to tensile stress, but it is very difficult to fasten these spokes to the rim and the hub without using a fastening metal piece specifically for adjusting their tension independently of one another, in order to ensure a balanced geometry in the wheel.

It is known to combine metallic and composite materials to make hybrid spokes.

For example, the document EP 1 930 146 describes a spoke comprising an aluminum core covered with a sheath formed of carbon fibers coated with polymerization-cured resin.

This spoke has the advantage of being very lightweight, due to its aluminum core. However, despite the use of a composite material, this spoke is not necessarily suitable for applications requiring very high rigidity, because the modulus of elasticity, and therefore the rigidity of the aluminum, is only on the order of 71,000 MPa. In addition, a spoke of this type requires specific and quite large fasteners on the rim and the hub, and such fasteners are not adaptable to all types of rims/hubs.

Another example of hybrid spoke is described in the document FR 2 915 710. In this case, the core is formed by a blade and two end pieces welded together. Given that welding locally deteriorates the properties of the metal, it is necessary to take such deterioration into account when sizing the core. Finally, obtaining a spoke that is adequately strong requires making a relatively heavy core. Moreover, a spoke having a core that requires three distinct elements assembled to one another is expensive to manufacture.

A third example of a hybrid spoke is provided in the document EP 1 420 963. The spoke illustrated in FIGS. 1 to 6 of this document comprises a metallic core having a constant cross section and a sheath made of composite material. The objective of the designer of such a spoke is to improve the aerodynamics, and he only provides a wing shape to the sheath.

SUMMARY

The invention provides a hybrid spoke that combines an excellent tensile strength and a certain degree of flexural flexibility while ensuring a minimum weight.

To this end, the invention provides a spoke having a metallic core, covered at least in its central portion, with a sheath made of a composite material formed of an assembly of fibers embedded in a matrix, the aforementioned metallic core comprising an end portion provided to be attached to the rim or the hub of a wheel, and a main portion having a cross-sectional surface area between 30% and 50%, or in a particular embodiment, between 35% and 45%, of the cross-sectional surface area of the end portion.

According to a particular embodiment, the core is made of steel and the sheath comprises carbon fibers.

According to a particular embodiment of the invention, the sheath has, in the area of the main body of the core, a cross section ranging between 150% and 500%, or, in a particular embodiment, between 150% and 350%, of the cross section of the metallic core in the same area.

According to a particular embodiment, the metallic core comprises two mechanical anchoring zones, each of which is located in the vicinity of one of its ends, and on both sides of the main body. Between these two mechanical anchoring zones, the outer surface of the core, in particular the outer surface of the main body of the core, is smooth. Beyond the two anchoring zones, the core comprises two intermediate zones, the outer surface of which is smooth.

The invention also provides for the manufacture of a spoke comprising a metallic core coated with a sheath made of a composite material, in which the main portion of the core is reduced through hammering.

The invention further provides for the manufacture of a spoke comprising a metallic core coated with a sheath made of a composite material, in which the main portion of the core is reduced using a method comprising the following steps: an annealing step, in which only certain previously work-hardened portions of a wire are heated for annealing, and a final swaging step, taking place after the annealing step, in which the annealed portions are swaged to decrease their cross section. The method may also comprise a preliminary swaging step, taking place before the annealing step, in which portions of the wire are swaged and constitute those portions that are then heated during the annealing step.

Finally, the invention also provides a wheel which is equipped with at least one spoke consistent with the foregoing.

BRIEF DESCRIPTION OF DRAWINGS

The invention will be better understood upon reading the following description of a spoke and a wheel according to the invention, given only by way of example and with reference to the annexed drawings, in which:

FIG. 11 is a perspective view of the wire of FIG. 7 at the end of a final swaging step;

FIG. 12 is a cross section along the plane VII in FIG. 11;

FIG. 13 is a perspective view of a device for carrying out a swaging operation;

DETAILED DESCRIPTION

Figures 1, 2, 3, 4, 5:
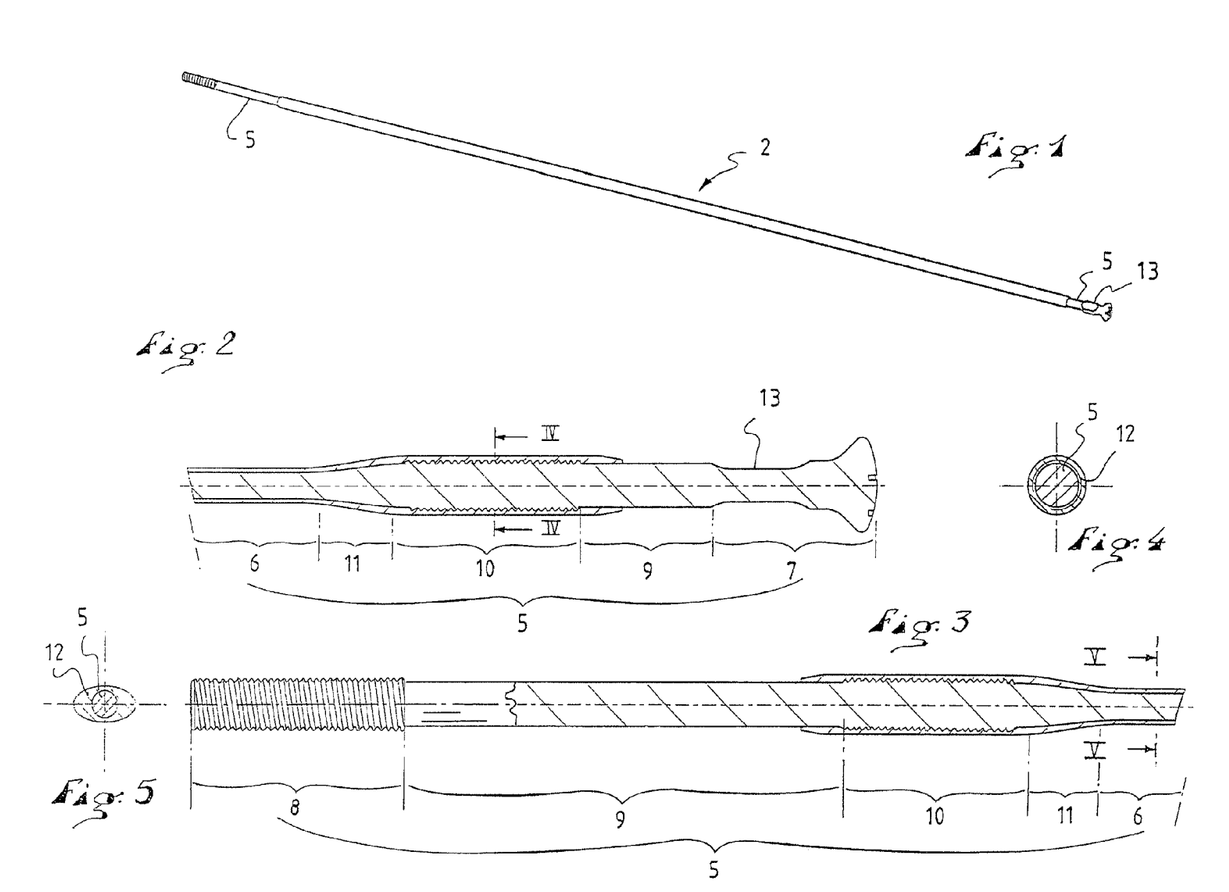
FIG. 1 shows a perspective view of a spoke according to one embodiment of the invention.
FIG. 2 is a longitudinal cross-sectional view of the right portion of the spoke shown in FIG. 1.
FIG. 3 is a longitudinal cross-sectional view of the left portion of the spoke shown in FIG. 1.
FIGS. 4 and 5 are transverse cross-sectional views of the spoke of FIG. 1.
Figures 1, 2, 3:
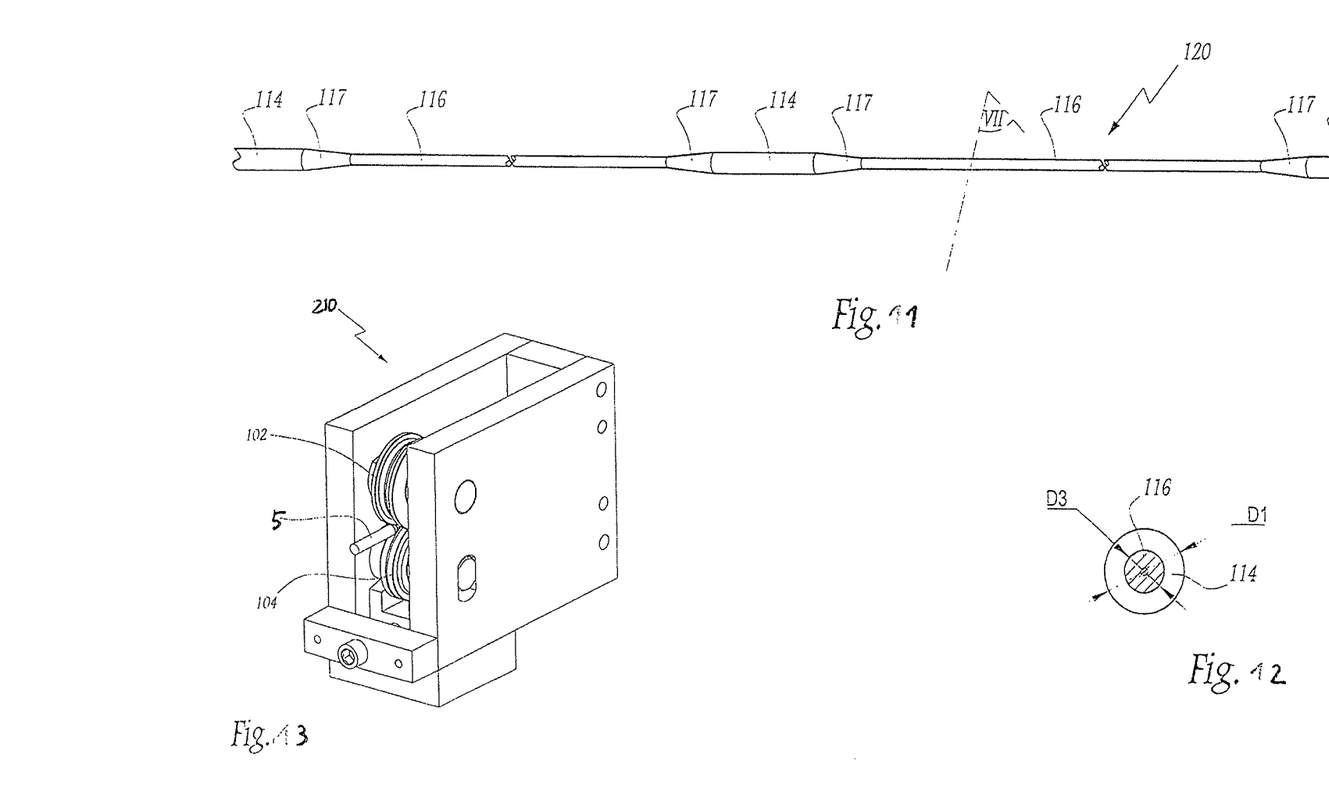

The spoke 2 according to the first embodiment of the invention comprises a core 5 made of stainless steel or carbon steel. This core is obtained from a steel wire of 2.0 millimeters (mm) in diameter. The core comprises a cross section that varies along its length. The main body 6 of the core constitutes the major portion of the length of the core. The diameter of the main body 6 of the core is reduced in relation to the diameter of the wire used to make the core. The diameter of the main body 6 is within a range between 55% and 70% of the original wire diameter or within a range of approximately 55% and approximately 70%. In this case, the diameter of the main body is about 1.25 mm. The reduction in the diameter of the main body is obtained through hammering.

The invention is not limited to the case in which the cross section of the main body 6 of the core is circular. In the case in which this cross section is elliptical or circular in shape, the ratio of the cross-sectional surface area of the main portion to that of the end portions of the spoke is between 30% and 50% or approximately between such limits.

Figure 6:
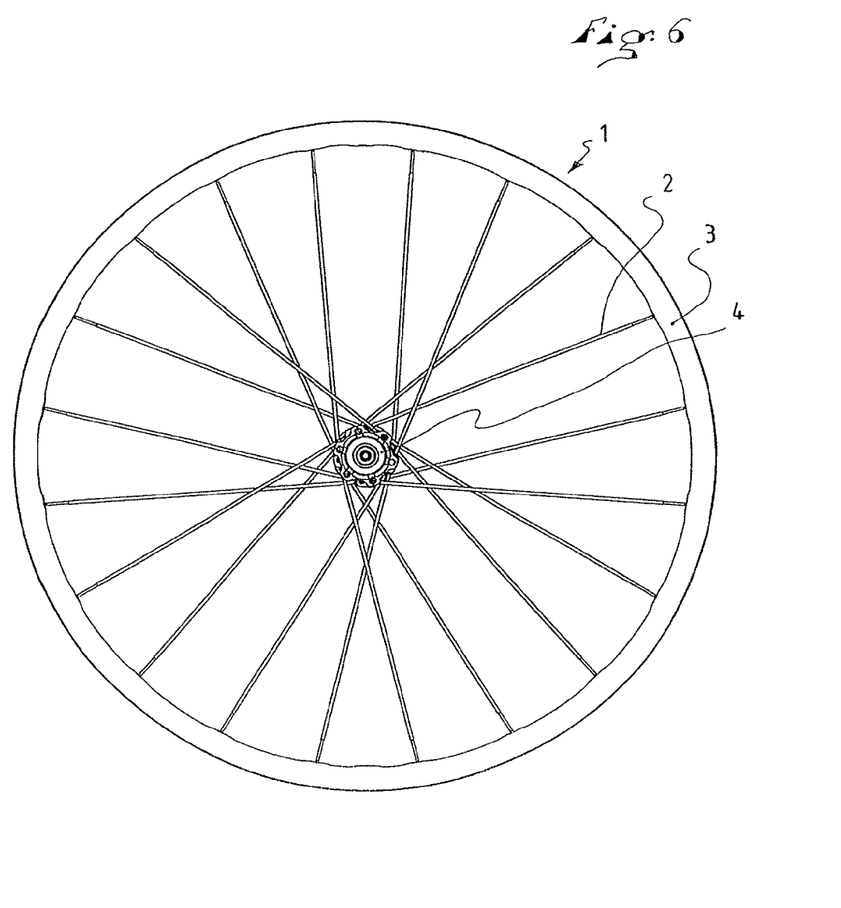
FIG. 6 shows a bicycle wheel according to one embodiment of the invention.

The metallic core 5 of the spoke is provided at both ends with attachment mechanisms or fasteners for attaching a spoke to the rim and the hub of the cycle wheel as shown in FIG. 6. In the example shown, the attachment mechanisms/fasteners are partially comprised of a head 7 having a diameter of about 3.9 mm. The head 7 is formed by striking the first end of the core 5, and the diameter of connection with the wire is increased during striking to 2.3 mm over several millimeters in the connection zone of the head in order to increase its strength, as exemplarily disclosed in the U.S. Pat. No. 7,181,844, the disclosure of which is hereby incorporated by reference thereto in its entirety. A reinforced shoulder is thus obtained, which can be retained in a bore having a smaller diameter than the diameter of the head 7. An anti-rotation plate 13, or flattened section, is added beneath the head to position the spoke angularly and to prevent it from turning.

The attachment mechanism further comprises a threaded zone 8 provided at the second end of the core. This threaded area can be screwed directly into the rim, in an internally threaded eyelet retained on the rim, or associated with a nut.

Three distinct and adjacent portions are located between the attachment mechanism 7, 8 and the main body of the core. An intermediate portion 9 is located in the immediate vicinity of the attachment mechanism on each side of the core. This intermediate portion has a smooth surface finish. The intermediate portions are several millimeters in length.

Two anchoring zones 10 are positioned so as to be adjacent the intermediate portions 9. The anchoring zones can be obtained by providing a thread at the periphery of the steel wire over a length of several millimeters, between 5 mm and 10 mm, and a diameter substantially equal to the initial diameter of the wire.

The two anchoring portions 10 are connected to the main body 6 of the core through zones 11 of gradual change in diameter.

A sheath 12 made of a composite material wraps the metallic core 5 over the entire central portion thereof. The sheath comprises a plurality of carbon filaments embedded in a thermosetting or thermoplastic resin. The sheath is mechanically affixed to the core 5 in the area of the two anchoring zones 10. Between these two anchoring zones 10, there is no positive-locking mechanical anchoring of the sheath and the metallic core; the connection interface is therefore smooth and the matrix of the composite thus has limited shear strength in this connection zone.

The absence of mechanical anchoring of the sheath 12 in area of the main body 6 of the core 5 guarantees a greater impact strength for the spoke, because when it is accidentally subject to a high shear force in its central portion by the intrusion of an obstacle, the shear stress between the core 5 and the sheath 12 quickly becomes greater than the shear stress allowable by the connection interface between the matrix of the sheath 12 and the central core 5. There follows a shear slide capable of absorbing a substantial amount of energy and boosting the impact strength of the spoke at the same time. After this shear slide of the interface, the spoke works less in bending and then behaves more like a cord than a flexing beam; it thus becomes bent in the impact zone in the manner of a high elongation metallic spoke, while a composite spoke, which only has a very limited elongation (less than 2%) due to the nature of its carbon fiber, will break once the elongation exceeds this low elongation ratio.

Advantageously, the spoke according to the invention comprises a certain quantity of composite material, that is to say, fibers embedded in the resin matrix. The ratio of the steel core to the composite material is illustrated in FIGS. 4 and 5.

FIG. 5 shows a transverse cross section of the spoke in the area of the main body 6. The main body represents between 70% and 85% of the total length of the spoke, or approximately within such limits. FIG. 5 shows that the surface or volume proportion of composite material is greater than that of the steel core, but not much greater than, for example, 10 times. In practice, the volume proportion of composite material is between 1.5 times and 5.0 times, or approximately within such limits, than the proportion of metallic material. These proportions may vary depending upon the materials selected. In the case in which the core is made of stainless steel and the sheath comprises carbon fibers, good results have been achieved with a spoke in which the proportion of composite material is between 1.5 times and 3.5 times the proportion of the core. On a transverse cross section such as that shown in FIG. 5, the surface area (Sf) of the cross section of the sheath 12 is between 150% and 350% of the surface area (Sa) of the cross section of the core 5. In the particular case described in FIGS. 1-5, Sf=2.2×Sa.

In the area of the anchoring zones 10, the cross-sectional surface area of the sheath is substantially the same as the sheath surface area (Sf) in the area of the main body. The surface area of the sheath in the area of the ends, that is to say, in the area of the anchoring zones, can represent between 50% and 200% of the surface area of the metallic core. In the particular case illustrated in FIGS. 1-5, the cross section of the sheath represents 80% of the cross section of the stainless core.

A spoke such as described provides an excellent balance of static strength, fatigue strength, specific strength and rigidity in relation to its total mass.

A spoke according to the invention can be made from a wire, for example, a stainless steel wire, by cutting the latter to the desired length, hammering the central portion (between 70% and 85% of its length) to reduce the diameter thereof, making the two anchoring zones 10, and then providing the attachment mechanisms at its two ends. The attachment mechanisms can be comprised of one or several threads, or one or several heads, or of any other attachment mechanisms commonly used to attach a spoke to a rim or a hub.

Once the metallic core is made according to this first method for manufacturing the core, a mold is used to make the composite material sheath directly around the core. Typically, the mold is comprised of a lower portion in which a portion of the composite material (fibers and resin) is positioned prior to positioning the metallic core therein. The latter is covered with the remaining portion of the composite material, and the mold is closed with the upper portion thereof.

The metallic core is not completely enclosed in the mold, as both of its ends project therefrom. The mold is closed on the intermediate portions mentioned hereinabove. To ensure proper sealing of the mold closure and to prevent resin leakage, it is important for these intermediate portions to have a smooth and even surface.

Figure 7:
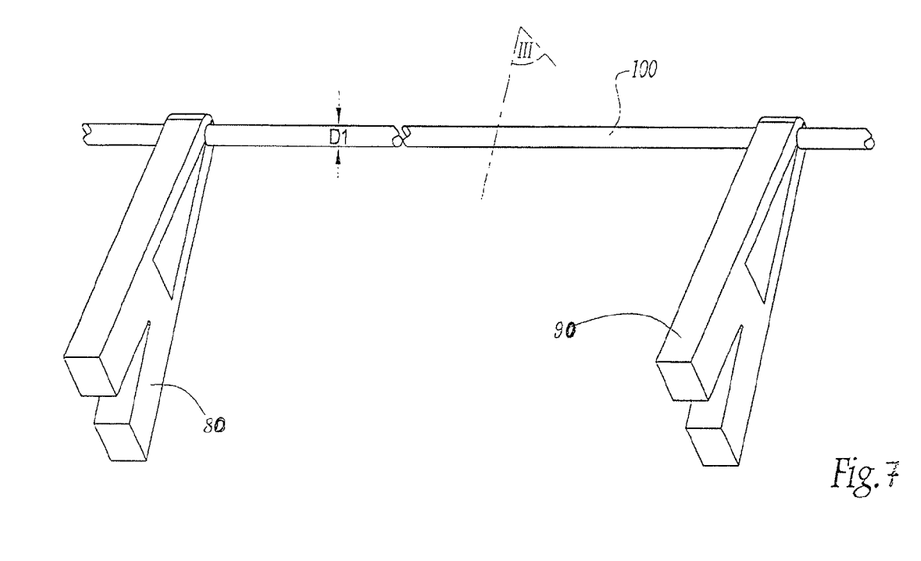
FIG. 7 is a perspective view of a wire from which the core of the spoke can be made according to a second manufacturing method.
Figure 8:
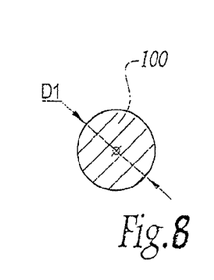
FIG. 8 is a cross section along the plane III of FIG. 7.

The following description relates to a second method for manufacturing the core 5 of the spoke 1 from a wire 100, partially shown in FIG. 7. The wire 100 can be obtained by means of a die, for example, and its length can be several times greater than the length of the spoke 1, in order to manufacture a plurality of spokes from the wire 100. It is also possible to start from a wire section having a length such that only one spoke can be made. As shown in FIG. 8, the diameter of the wire 100 is equal to the diameter D1 of the end zones of the core 5. The wire 100 is shown in a configuration in which it is held by two clamps 80 and 90. The transverse cross section of the wire 100 is circular; however, in an alternative, the transverse cross section of the wire 100 can have a different geometry, such as rectangular, for example.

Figures 9, 10:
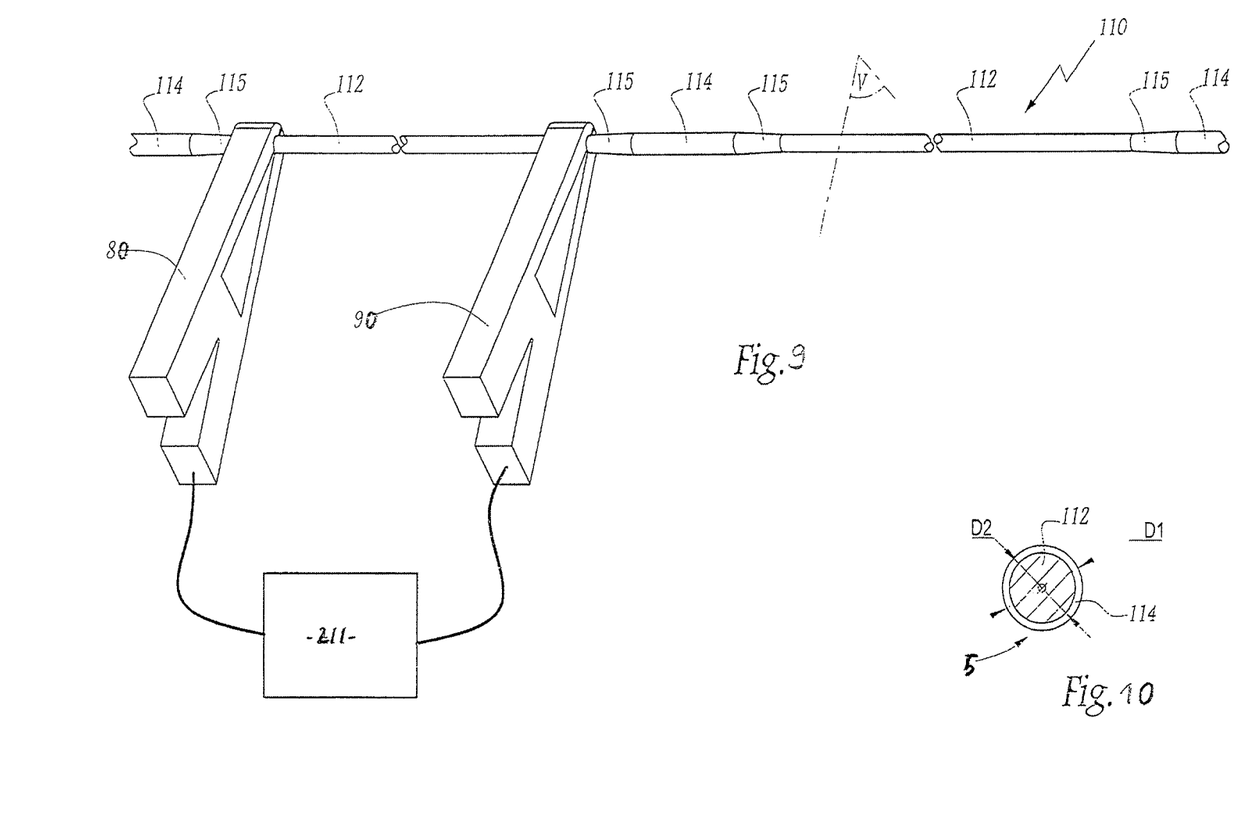
FIG. 9 is a perspective view of the wire of FIG. 7 at the end of a preliminary swaging step.
FIG. 10 is a cross section along the plane V in FIG. 9.

FIG. 9 shows a wire 110 corresponding to the wire 100 of FIG. 7 at the end of a preliminary swaging step. The wire 110 comprises long portions 112 shown partially and separated from one another by short portions 114. As explained below, after the core 5 is made, the long portions 112 form the main body 6 of the core and the short portions 114 form the ends. The short portions 114 have the same diameter D1 as the wire 100, and the long portions 112 have a diameter D2 smaller than the diameter D1 but greater than the diameter D3 of the central portion of the wire 110. The portions 112 and 114 are connected to one another by frustoconical connecting portions 115.

In the preliminary swaging step, the wire 110 is swaged only in the area of its portions which, at the end of this step, correspond to the long portions 112 of the wire 110, so as to reduce their diameter until reaching the diameter D2. At the same time, the frustoconical portions 115 are also progressively swaged to ensure continuity of the diameter of the wire 110.

This swaging operation can be performed, for example, by passing the wire 100 between two rollers 102 and 104 integral with an ad hoc device 210, as shown in FIG. 13. For example, to carry out the swaging operation by means of the device 210, the ends of one of the portions of the wire 100 being swaged are each held by a jaw, one portion of which is fixed and the other portion of which is movable and stretches the portion of the wire to be swaged while the rollers 102 and 104 compress the portion of the wire to swag it.

The swaging operation can be performed cold, or by heating at least the portion of the wire to be swaged.

At the end of the preliminary swaging step, the long portions 112 of the wire 110 are work-hardened, and their hardness is increased.

It is advantageous to further reduce the diameter D2 of the long portions 112 in order to lighten the spoke 1 and improve its aerodynamics. However, if the diameter D2 of the long portions 112 is further reduced during the preliminary swaging step, the long portions 112 become brittle and may break during manufacture of the spoke or when the cycle is being used. For example, a value of 2.0 mm for the diameter D1 of the wire 100 is switched to a value of 1.8 mm for the diameter D2 of the long portions 112.

In order to further reduce the diameter D2 of the long portions 112, the method comprises an annealing step, in which only the long portions 112 are heated in order to be annealed. The annealing makes it possible to reduce or eliminate the internal stresses of the material by restoring elongation, but degrades its mechanical strength by making it softer. The short portions 114 of the wire 110, which ultimately constitute the ends of the core, are not annealed because it is advantageous for them to maintain their mechanical strength, given that during use, the ends of the core are more exposed to fatigue development than the main body 6 of the core.

Figure 14:
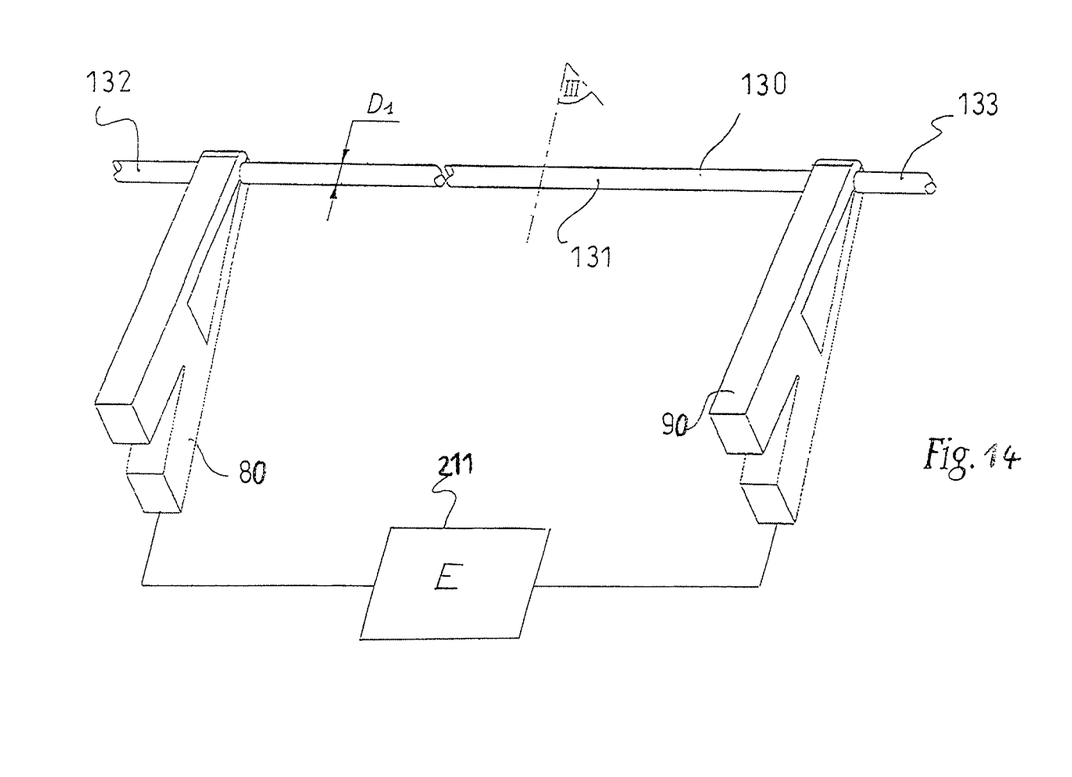
FIG. 14 is a perspective view of a wire relative to a third method for manufacturing the metallic core.

The annealing operation can be performed, for example, by passing an electric current in the long portions 112 of the wire 110 and possibly in the frustoconical portions 115. To this end, as shown in FIG. 14, for example, the terminals of an electric generator 211 can be connected to the clamps 80 and 90, which are made from an electricity-conducting material. Thus, the portions 112 are heated by the Joule effect for annealing.

Advantageously, the generator 211 is set so as to obtain an annealing after a short heating time. For example, for 4V and 27 A, the temperature of the long portions 112 can be raised to about 850° C., which makes it possible to obtain an annealing in about eight seconds, although the time can be reduced by increasing the intensity.

Due to the reduced cross section between the diameter D1 and the diameter D2, the long portions 112 are markedly more resistive than the frustoconical portions 115 and the short portions 114; thus, heating is electrically located in the long portion 112 that is more resistive.

In an alternative embodiment, the annealing operation can be carried out by induction heating the wire.

In another alternative embodiment, the annealing operation can be carried out by heating the wire on a flame generated by the combustion of a gas or other fuel.

Advantageously but not essentially, during the annealing step, at least the long portions 112 can be positioned in a closed enclosure, for example a peripheral sheath having a diameter slightly greater than the diameter D2, containing a neutral atmosphere. This prevents the oxidation of the long portion 112, caused by the heat, and therefore does not degrade the surface finish.

In an alternative embodiment, the current supplied by the generator 211 to perform the annealing operation can be transmitted to the long portions 112 via the rollers 102 and 104 of the device 210, thereby simplifying the manufacturing method. In this case, a first terminal of the generator is connected to one and/or the other of the rollers 102 and 104, and one end of the long portion 112 is positioned between the rollers 102 and 104. The other terminal of the generator is connected to the other end of this long portion 112, for example by means of a clamp similar to the clamps 80 and 90. This implementation can also be used for heating at least the portions of the wire 100 that are swaged during the preliminary swaging step. In this implementation, the heating can be almost simultaneous with the swaging operation.

The method comprises a final swaging step, taking place after the annealing step, in which the long portions 112 are swaged again to reduce their diameter. The short portions 114 are not modified. The implementation of the swaging operation performed during the final swaging step may be similar to that of the preliminary swaging step. FIGS. 11 and 12 thus show a wire 120 corresponding to the wire 110 of FIGS. 9 and 10, at the end of the final swaging step.

The wire 120 includes the long portions 116 shown partially and separated from one another by the short portions 114. At the end of the final swaging step, the long portions 112 of the wire 110 form the long portions 116 of the wire 120. The short portions 114 are connected to the long portions 116 by frustoconical portions 117. During the final swaging step, the frustoconical portions 115 of the wire 110 are swaged to ensure continuity of the diameter of the wire 120.

Upon completion of the manufacture, the long portions 116 of the wire 120 constitute the main body 6 of the core 5. At the end of the final swaging step, the long portions 116 of the wire 120 have the same diameter D3 as that of the main body 6 of the core 5.

The transverse cross-sectional surface area of the long portions 116, which is a function of their diameter D3 squared, can be reduced to about 0.3 times the transverse cross-sectional surface area of the short portions 114, which is a function of their diameter D1 squared. Such a reduction in cross section is made possible by the annealing step. Indeed, the annealing advantageously makes it possible to reduce or eliminate the internal stresses of the wire to make it less brittle by restoring elongation therein. The annealing can restore in the material at least as much elongation as it had prior to the preliminary swaging step.

More generally, according to the invention, the cross-sectional surface area of the main body 6 is less than or equal to 0.5 times the transverse cross-sectional surface area of the end portions of the core.

Thus, the second manufacturing method makes it possible to further reduce the cross section of the main body 6 of the core 5 with respect to the initial cross section of the wire 100.

In a cutting step, the wire is sectioned in the area of each short portion 114 so as to form a plurality of sections, from which the spokes 1 will be made. This cutting step can be carried out after the final swaging step.

In a shaping step, the ends of the spoke 1 are shaped to obtain the geometry of the end portions of the core, that is to say, to obtain a geometry which enables the end portions of the core to be attached to the rim and the hub of the wheel. The shaping step can be performed before or after the final swaging step, for example by cold deformation, cold forging, thread rolling, machining, or forging.

The following description relates to a third method for manufacturing the core 5. In the third manufacturing method, the preliminary swaging step is not carried out. A wire 130 has a diameter D1 and a length depending upon the type of manufacturing selected, whether serial or per unit manufacturing. Such a wire is shown in FIG. 14. In the example shown in FIG. 14, the wire has been cut into sections having a length such that only one spoke core will be made from each section (per unit manufacturing).

According to the invention, an annealing step for certain portions of the wire is carried out. The annealing operation can be performed, for example, by passing an electric current through the central portion 131 of the wire 130. To do this, as shown in FIG. 14, the terminals of a power generator 211 can be connected, for example, to the clamps 80 and 90, which are made from an electricity-conducting material. Thus, the portion 131 is heated by the Joule effect for annealing. The wire portions 132 and 133, which are positioned outside of the clamps 80 and 90, are not heated, and their mechanical properties are modified.

Following the localized annealing operation, the third method comprises a final swaging step during which the central portion 131 is swaged. At the end of this swaging step, the diameter D3 of the main body is reduced. Advantageously, this swaging step makes it possible to reduce the diameter of the wire into a larger proportion than that usually obtained in the manufacture of bicycle wheel spokes. For example, starting from a wire of 2.0 mm in diameter, this method makes it possible to obtain a reduction in diameter of the central portion 131 in a range between 1.4 and 1.2 mm. In the end, a monolithic spoke core is obtained, whose main body has a diameter less than 70% of the diameter of its ends. These values are to be compared with the values obtained with the methods of the prior art, in which, for similar steels or alloys, the proportion of the diameter ratio (central portion/ends) is greater than 75%.

The third method may also include shaping and coating steps, similar to those described in the first method.

The three methods for manufacturing a spoke core described above are particularly advantageous in making a spoke core according to the invention, that is to say, in making a spoke core, the main body of which has a significant reduction in diameter. These manufacturing methods are given here by way of example and are not the only possible methods within the scope of the invention.

At least because the invention is disclosed herein in a manner that enables one to make and use it, by virtue of the disclosure of particular exemplary embodiments of the invention, the invention can be practiced in the absence of any additional element or additional structure that is not specifically disclosed herein.

The invention claimed is:

1. A spoke for a cycle wheel, the spoke comprising:
a metallic core;
a sheath covering at least a central portion of the metal core, the sheath comprising a composite material, the composite material comprising an assembly of fibers embedded in a matrix;
the core comprising:
an end portion structured and arranged to be attached to the rim or the hub of a wheel;
a main body having a cross-sectional surface area between approximately 30% and approximately 50% of a cross-sectional surface area of the end portion.

2. A spoke according to claim 1, wherein:
in a predeterminate area of the main body, the sheath has a cross section between approximately 150% and approximately 500% of a cross section of the metallic core in said predeterminate area.

3. A spoke according to claim 1, wherein:
the cross-sectional surface area of the main body of the core is between approximately 35% and approximately 45% of a cross sectional surface area of the end portion;
in an area of the main body, a cross-sectional surface area of the sheath is between 150% and 350% a cross-sectional surface area of the core in said area of the main body.

4. A spoke according to claim 1, wherein:
the core comprises two mechanical anchoring zones, each of the anchoring zones being located in a vicinity of a respective end of the core on either of two sides of the main body.

5. A spoke according to claim 4, wherein:
between the two mechanical anchoring zones an outer surface of the main body of the core is smooth.

6. A spoke according to claim 4, wherein:
beyond the two anchoring zones the core comprises two intermediate zones having a smooth outer surface.

7. A spoke according to claim 4, wherein:
between the two mechanical anchoring zones there is no mechanical anchoring between the core and the sheath.

8. A method for manufacturing a spoke for a cycle wheel according to claim 1, the method comprising:
hammering the core to reduce the diameter of the core in an area of the main body.

9. A method for manufacturing a spoke for a cycle wheel according to claim 1, the method comprises:
heating, for annealing, only certain previously work-hardened portions of a wire of the core;
swaging, after the annealing and at an end of the method, annealed portions of the wire to reduce the cross sections of said portions.

10. A method according to claim 9, further comprising:
swaging, before said annealing, in which portions of the wire are swaged to constitute said certain portions that are then heated during said annealing.

11. A method according to claim 10, wherein:
the electric current is transmitted to the wire by rollers integral with a device used to carry out the swaging prior to the annealing and/or the swaging after the annealing.

12. A method according to claim 9, wherein:
heating, by means of an electric current during said annealing, said certain portions of the wire.

13. A method according to claim 9, wherein:
during said annealing, positioning at least said certain portions of the wire in an enclosure containing a neutral atmosphere.

14. A method according to claim 9, further comprising:
shaping ends of the core to provide said ends with a geometry for attachment to the cycle wheel.

15. A spoke according to claim 1, wherein:
the spoke consists of two elements, said two elements being the core and the sheath.

16. A spoke for a cycle wheel, the spoke comprising:
a longitudinally extending core comprising:
a single metallic piece extending between a pair of end portions, each of the end portions being structured and arranged to be attached to a respective one of a rim and a hub of a wheel;
a main body having a cross-sectional surface area between 30% and 50% of a cross-sectional surface area of each of the end portions;
a sheath comprising a composite material comprising an assembly of fibers embedded in a matrix; and
the sheath covering at least a central portion of the single metallic piece of the core and being mechanically affixed to the single metallic piece of the core at a pair of spaced-apart anchoring zones of the single metallic piece of the core, the single metallic piece of the core projecting longitudinally from each of respective ends of the sheath in a direction toward respective ones of the end portions of the single metallic piece of the core.

17. A spoke according to claim 16, wherein:
each of the anchoring zones of the core comprises a threaded portion of the core, the sheath being affixed to the core by means of the threaded portions.

18. A spoke according to claim 16, wherein:
the main body of the spoke has a length of 70% to 85% of a total length of the spoke.

19. A wheel comprising:
a hub;
a rim;
a spoke comprising:
a metallic core;
a sheath covering at least a central portion of the metal core, the sheath comprising a composite material, the composite material comprising an assembly of fibers embedded in a matrix;
the core comprising:
an end portion structured and arranged to be attached to the rim or the hub of a wheel;
a main body having a cross-sectional surface area between approximately 30% and approximately 50% of a cross-sectional surface area of the end portion.

* * * * *